United States Patent
Siddiqi et al.

(10) Patent No.: US 11,442,978 B2
(45) Date of Patent: Sep. 13, 2022

(54) HEURISTIC FOR THE DATA CLUSTERING PROBLEM

(71) Applicant: King Fahd University of Petroleum and Minerals, Dhahran (SA)

(72) Inventors: Umair F. Siddiqi, Dhahran (SA); Sadiq M. Sait, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 178 days.

(21) Appl. No.: 15/909,328

(22) Filed: Mar. 1, 2018

(65) Prior Publication Data

US 2019/0272333 A1    Sep. 5, 2019

(51) Int. Cl.
     *G06F 16/22*      (2019.01)
     *G06F 16/51*      (2019.01)
     *G06K 9/62*      (2022.01)
     (Continued)

(52) U.S. Cl.
     CPC .......... *G06F 16/51* (2019.01); *G06F 16/2228* (2019.01); *G06F 16/2365* (2019.01);
     (Continued)

(58) Field of Classification Search
     CPC ................ G06F 16/51; G06F 16/2228; G06F 16/2365; G06F 16/287; G06F 16/5838;
     (Continued)

(56) References Cited

U.S. PATENT DOCUMENTS

2008/0082426 A1*   4/2008   Gokturk ............. G06Q 30/0625
                                                            705/26.62
2009/0310861 A1*   12/2009   Lang .................... G06K 9/4638
                                                             382/173

(Continued)

FOREIGN PATENT DOCUMENTS

CN           106649456 A      5/2017

OTHER PUBLICATIONS

E. R. Hruschka, R. J. G. B. Campello, A. A. Freitas and A. C. Ponce Leon F. de Carvalho, "A Survey of Evolutionary Algorithms for Clustering," in IEEE Transactions on Systems, Man, and Cybernetics, Part C (Applications and Reviews), vol. 39, No. 2, pp. 133-155, Mar. 2009. doi: 10.1109/TSMCC.2008.2007252.*

(Continued)

*Primary Examiner* — Mark D Featherstone
*Assistant Examiner* — Samuel C Sharpless, III
(74) *Attorney, Agent, or Firm* — Oblon, McClelland, Maier & Neustadt, L.L.P.

(57) ABSTRACT

A heuristic method for the data clustering problem includes a greedy algorithm, which selects the centroids of well-separated clusters, and a single-solution-based heuristic, which performs clustering with the objective of optimizing a cluster validity index. The attributes of the centroids of clusters are genes and a fitness is determined for each gene. A mutation operation changes the values of the genes of low fitness values and creates a mutant solution. The values of genes of the mutant can replace the values of the genes of the parent if they are better than the genes of the parent. Diversification in the search process is maintained by allowing, with a small probability, the genes of the mutant to replace the genes of the parent even if they are not better than them.

18 Claims, 7 Drawing Sheets

(51) Int. Cl.
G06F 16/28 (2019.01)
G06F 16/23 (2019.01)
G06F 16/583 (2019.01)
G06V 30/194 (2022.01)

(52) U.S. Cl.
CPC ........ *G06F 16/287* (2019.01); *G06F 16/5838* (2019.01); *G06K 9/6223* (2013.01); *G06V 30/194* (2022.01)

(58) Field of Classification Search
CPC ............... G06K 9/6223; G06K 9/6272; G06K 9/6215; G06V 30/194; G06V 10/761
See application file for complete search history.

(56) References Cited

U.S. PATENT DOCUMENTS

| 2010/0086224 | A1* | 4/2010 | Demirci | G06K 9/00711 |
| | | | | 382/238 |
| 2013/0031063 | A1 | 1/2013 | Freris et al. | |
| 2017/0142426 | A1* | 5/2017 | Kempf | H04N 1/644 |
| 2017/0249674 | A1* | 8/2017 | Kerger | G06Q 30/0276 |

OTHER PUBLICATIONS

S. Das, A. Abraham and A. Konar, "Automatic Clustering Using an Improved Differential Evolution Algorithm," in IEEE Transactions on Systems, Man, and Cybernetics—Part A: Systems and Humans, vol. 38, No. 1, pp. 218-237, Jan. 2008. doi: 10.1109/TSMCA.2007.909595 keywords: {genetic algorithms;image classification.*

Ujjwal Maulik, et al., "Genetic algorithm-based clustering technique", May 27, 2004, http://berlin.csie.ntnu.edu.tw/PastCourses/2004S-MachineLearningandDataMining/lectures/MLDM2004S_Paper-Genetic%20algorithm-based%20clustering%20technique.pdf.

Rahashree Dash, et al., "Comparative Analysis of K-Means and Genetic Algorithm Based Data Clustering", International Journal of Advanced Computer and Mathematical Sciences, vol. 3, Issue 2, 2012, pp. 257-265.

Qi Kang, et al., "A weight-incorporated similarity-based clustering ensemble method based on swarm intelligence", Knowledge-Based Systems, vol. 104, 2016, pp. 156-164, Apr. 2016.

Eduardo Raul Hruschka, et al., "A Survey of Evolutionary Algorithms for Clustering", IEEE Transactions on Systems, Man, and Cybernectics—Part C: Applications and Reviews, vol. 39, No. 2, Mar. 2009, pp. 133-155.

Ujjwal Maulik, et al., "Genetic algorithm-based clustering technique", Pattern Recognition, vol. 33, 2000, pp. 1455-1465.

Swagatam Das, et al., "Automatic Clustering Using an Improved Differential Evolution Algorithm", IEEE Transactions on Systems, Man, and Cybernetics—Part A: Systems and Humans, vol. 38, No. 1, Jan. 2008, pp. 218-237.

* cited by examiner

Input: $D, K, \alpha, \beta, fn$

Output: $\{C_0^c, ..., C_{K-1}^c\}$

1: Initialize the centroids of $K$ clusters (i.e., $\{C_0^c, C_1^c, ..., C_{K-1}^c\}$) to randomly selected unique points from $D$.

2: $i = 0$

3: while $i < \alpha$ do

4:   $\overline{D} = D - \{C_0^c, C_1^c, ..., C_{K-1}^c\}$

5:   $z$ = a random number between 0 and $K - 1$

6:   $D_z = \{C_0^c, C_1^c, ..., C_{K-1}^c\} - C_z^c, P_z = C_z^c$

7:   $f_0 = f_n(\{C_0^c, ..., C_{K-1}^c\})$

8:   $C_z^c = argmax(\frac{\sum_{z \in D_z}(\|x-y\|)}{K-1}) \; y \in \overline{D}$ 9:   if $f_n(\{C_0^c, ..., C_{K-1}^c\}) < f_0$ then 10:     $C_z^c = P_z$ 11:   endif 12:   i++

13:   if no change in $\{C_0^c, ..., C_{K-1}^c\}$ occurs in the last $\beta$ iterations then 14:     Break 15:   endif 16: endwhile 17: return ($\{C_0^c, ..., C_{K-1}^c\}$)

| 0 | 4 | 7 | 3 | 5 | 1 | 3 |
|---|---|---|---|---|---|---|
| 1 | 2 | 6 | 2 | 1 | 5 | 2 |
| 1 | 2 | 1 | 5 | 7 | 3 | 4 |
| 2 | 2 | 6 | 1 | 6 | 6 | 2 |
| 0 | 3 | 5 | 1 | 1 | 1 | 3 |
| 6 | 2 | 1 | 2 | 3 | 4 | 2 |

(a) Compressed image

| 128 | 10 | 13 |
|---|---|---|
| 12 | 45 | 100 |
| 100 | 12 | 89 |
| 12 | 22 | 89 |
| 67 | 90 | 150 |
| 70 | 65 | 20 |
| 90 | 120 | 1 |
| 160 | 200 | 240 |

(b) Centers of the clusters ($K=8$)

HEURISTIC FOR THE DATA CLUSTERING PROBLEM

CROSS-REFERENCE TO RELATED PUBLICATION

The document, Siddiqi, Umair & Sait, Sadiq (2017), A New Heuristic for the Data Clustering Problem, IEEE Access, PP. 6801-6812, 10.1109/ACCESS 2017 2691412, is herein incorporated by reference in its entirety.

BACKGROUND OF THE INVENTION

Field of the Invention

The present disclosure relates generally to data clustering, and in particular a clustering heuristic having a greedy algorithm as a first part and a heuristic for optimal clustering.

Description of the Related Art

Clustering refers to the partitioning of a set of data-points into groups in such a way that each data-point is maximally similar to the data-points within its cluster. See *Britannica Academic*, accessed on Jul. 8, 2017. [Online]. Available: http://academic.eb.com/levels/collegiate/article/605385; and C. C. Aggarwal and C. K. Reddy, *Data Clustering*. Boca Raton, Fla., USA: Chapman & Hall, 2016, each incorporated herein by reference in their entirety. Clustering is an important problem in data-mining and machine learning. Some popular applications of clustering are as follows: (i) clustering is used to summarize data in many data-mining problems such as outlier analysis and classification; (ii) clustering is used to group like-minded users and similar customers in collaborative filtering and customer segmentation; (iii) clustering is used to create compact data representations; (iv) clustering is used to detect key trends and events in the streaming data of social networking applications; and (v) clustering is used to group similar genes in gene-expression data analysis. See D. Jiang, C. Tang, and A. Zhang, "Cluster analysis for gene expression data: A survey," *IEEE Trans. Knowl. Data Eng.*, vol. 16, no. 11, pp. 1370-1386, November 2004, incorporated herein by reference in its entirety. The clustering problem is NP hard when both or at-least one of the following two terms in not a fixed constant: (i) number of clusters; and (ii) and number of dimensions. See M. Mahajan and P. Nimbhorkar and K. Varadarajan, "The planar k-means problem is NP-hard," Theoretical Computer Science, vol. 442, no. Supplement C, pp. 13-21, 2012, incorporated herein by reference in its entirety. In computer science, NP relates to time complexity and means Non-deterministic Polynomial. NP-hard may refer to a class of problems that cannot be solved in polynomial time. Subsequently, problems that are considered as NP-hard problems are typically solved using heuristics.

Clustering algorithms are usually classified into two types: (a) Partitional clustering, and (b) Hierarchical clustering. Partitional clustering algorithms iteratively split data into clusters. A data-item can belong to only one partition. The total numbers of clusters (K) should be known in advance, unless, additional methods are employed to determine the number of clusters. In hierarchical clustering, a dendrogram (or clustering tree) is generated. The first step is to build a similarity matrix between all data-points and selects a pair of data-items that are maximally similar to each other. In the second step, the similarity matrix is updated and the data-items that were selected in the previous step are replaced by a single entry for the pair. The remaining steps repeat the same procedure to complete tree construction. See M. Greenacre and R. Primicerio, *Multivariate Analysis of Ecological Data*. Bilbao, Spain: Fundacin BBVA, 2013, incorporated herein by reference in its entirety. Hierarchical clustering automatically determines the number of clusters.

The quality of clustering is measured in terms of its compactness and separation. A cluster is said to be compact when its data-points are similar to each other. A cluster has good separation when its data-points are maximally dissimilar with the data-points of the other clusters. The similarity between two data-items can be determined in terms of several measures such as: Minkowski Distance, Cosine distance, Correlation coefficients (e.g. Pearson, Spearman). Minkowski Distance is the most popular method and has a parameter p. When p=1, it yields Manhattan distance, and when p=2, it returns Euclidean distance. The choice of similarity measure usually depends on the application area where clustering is applied. Euclidean distance is most commonly used similarity measure and produces good results in majority of applications. See P. A. Jaskowiak, R. J. G. B. Campello, and I. G. Costa, "Proximity measures for clustering gene expression microarray data: A validation methodology and a comparative analysis," *IEEE/ACM Trans. Comput. Biol. Bioinf.*, vol. 10, no. 4, pp. 845-857, July 2013, incorporated herein by reference in its entirety. The quality of a clustering solution is determined using a validity index. The validity indices compute both compactness and separation between clusters. Some popular quality measures are as follows: (a) Davies Bouldin Index (DBI); (ii) Calinski Harabasz Index (CHI); (iii) Dunn Index (DI); (iv) Silhouette Index (SI); and (v) SD Validity Index (SDI). See D. L. Davies and D. W. Bouldin, "A cluster separation measure," *IEEE Trans. Pattern Anal. Mach. Intelli.*, vol. 1, no. 2, pp. 224-227, April 1979; T. Califiski and J. Harabasz, "A dendrite method for cluster analysis," *Commun. Statist.*, vol. 3, no. 1, pp. 1-27, January 1974; J. C. Bezdek and N. R. Pal, "Cluster validation with generalized Dunn's indices," in *Proc. 2ndNew Zealand Int. Two-Stream Conf. Artif Neural Netw. Expert Syst.*, Dunedin, New Zealand, November 1995, pp. 190-193; J. C. Dunn, "Well-separated clusters and optimal fuzzy partitions," *J. Cybern.*, vol. 4, no. 1, pp. 95-104, January 1974; P. J. Rousseeuw, "Silhouettes: A graphical aid to the interpretation and validation of cluster analysis," *J Comput. Appl. Math.*, vol. 20, no. 1, pp. 53-65, 1987; and M. Halkidi, M. Vazirgiannis, and Y. Batistakis, *Quality Scheme Assessment in the Clustering Process*. Berlin, Germany: Springer, 2000, pp. 265-276. [Online]. Available: http://dx.doi.org/10.1007/3-540-45372-5_26, each incorporated herein by reference in their entirety.

In optimization perspective, clustering problem is considered as an NP-hard grouping problem. See M. Nicholson, "Genetic algorithms and grouping problems," *Softw., Pract. Exper.*, vol. 28, no. 10, pp. 11371138, August 1998. [Online]. Available: http://onlinelibrary.wiley.com/doi/10.1002/(SICI)1097-024X(199808)28:10%3C1137::AID-SPE192%3E3.0.CO;2-4/abstract; and E. R. Hruschka, R. J. G. B. Campello, A. A. Freitas, and A. C. P. L. F. de Carvalho, "A survey of evolutionary algorithms for clustering," *IEEE Trans. Syst., Man, Cybern. C, Appl. Rev.*, vol. 39, no. 2, pp. 133-155, March 2009, each incorporated herein by reference in their entirety. Heuristics such as Evolutionary algorithms (EAs) are popular in solving NP-hard problems. See S. M. Sait and H. Youssef, *Iterative Computer Algorithms With*

*Applications in Engineering*. Los Alamitos, Calif., USA: IEEE Computer Soc. Press, 1999; and S. M. Sait and H. Youssef, *VLSI Physical Design Automation Theory and Practice*. Singapore: World Scientific, 1999, each incorporated herein by reference in their entirety. Recently, several evolutionary algorithms (EAs) have been proposed to perform clustering. The EAs can perform clustering using either a fixed or variable K value and find clustering that is optimal w.r.t. to a validity index. The EAs with a fixed K value are useful in the following two cases: (i) Some information about the classes in data is known, or (ii) The value of K can be obtained using other methods such as the method proposed by Sugar and James. See C. A. Suger and G. M. James, "Finding the number of clusters in a dataset: An information-theoretic approach," *J. Amer. Statist. Assoc.*, vol. 98, no. 463, pp. 750-763, September 2003. [Online]. Available: https://search.proquest.com/docview/27483-9860?accountid=27795, incorporated herein by reference in its entirety. The EAs are compared with each other in terms of two criterion: (i) their best objective function value; and (ii) the number of evaluations of the objective function they need to converge to their best result (known as evaluation count or number of evaluations). The objective function is usually computationally intensive and the EAs that have a large evaluation count are considered to be slower than the EAs that have a smaller evaluation count. See S. Das, A. Abraham, and A. Konar, "Automatic clustering using an improved differential evolution algorithm," *IEEE Trans. Syst., Man, Cybern. A, Syst. Humans*, vol. 38, no. 1, pp. 218-237, January 2008; E. Cuevas, E. Santuario, D. Zaldivar, and M. Perez-Cisneros, "An improved evolutionary algorithm for reducing the number of function evaluations," *Intell. Autom. Soft Comput.*, vol. 22, no. 2, pp. 177-192, April 2016; W. Zhu, Y. Tang, J.-A. Fang, and W. Zhang, "Adaptive population tuning scheme for differential evolution," *Inf Sci.*, vol. 223, pp. 164-191, February 2013. [Online]. Available: http://www.sciencedirect.com/science/article/pii/S0020025512006123; and M. S. Gibbs, H. R. Maier, and G. C. Dandy, "Using characteristics of the optimisation problem to determine the genetic algorithm population size when the number of evaluations is limited," *Environ. Model. Softw.*, vol. 69, pp. 226-239, July 2015. [Online]. Available: http://www.sciencedirect.com/science/article/pii/S1364815214002473, each incorporated herein by reference in their entirety. The EAs can either use a population of solutions or use only one solution. The single-solution-based EAs have smaller evaluation count but their solution quality is usually not as good as population-based EAs.

EAs used to solve the clustering problem include those of Selim and Alsultan who proposed an application of a Simulated Annealing (SA) algorithm to the clustering problem. See S. Z. Selim and K. Alsultan, "A simulated annealing algorithm for the clustering problem," *Pattern Recognit.*, vol. 24, no. 10, pp. 1003-1008, January 1991. [Online]. Available: http://www.sciencedirect.com/science/article/pii/003132039190097O, incorporated herein by reference in its entirety. The solution is represented in terms of an assignment vector of length equal to the number of data-points. For each data-point, the vector holds the index of the cluster to which it is currently assigned. The perturb operation consists of changing the assignment of a randomly selected data-point. The solution obtained from the perturb operation is always accepted if it is better than the existing one, otherwise, it is accepted with a very small probability.

Maulik and Bandyopadhyay proposed a Genetic Algorithm (GA) for the clustering problem. See U. Maulik and S. Bandyopadhyay, "Genetic algorithm-based clustering technique," *Pattern Recognit.*, vol. 33, no. 9, pp. 1455-1465, September 2000. [Online]. Available: http://www.sciencedirect.com/science/article/pii/S0031320399001375, incorporated herein by reference in its entirety. The chromosome is represented by a vector that contains centroids of all clusters. The objective function is equal to the sum of the Euclidean distances of the data-points from the centroids of their clusters. The fitness of a centroid (or cluster) is computed in two steps. In the first step, the centroid is updated to the current mean of the data-points that are assigned to it. The second step is to compute the mean of the Euclidean distances of all data-points from the centroids of their clusters. The selection function uses fitness values to select the best chromosomes from the population. It uses one-point crossover and mutation operations and fixed cross-over and mutation probabilities. In the mutation operation, an attribute is randomly selected and a random number between 0-1 is added or subtracted to it. The experimental results showed that the GA-based clustering method has produced much better results as compared to the K-means method.

Das et al. [have proposed a Differential Evolution (DE) algorithm for the clustering problem that also automatically determines the number of clusters. See S. Das, A. Abraham, and A. Konar, "Automatic clustering using an improved differential evolution algorithm," *IEEE Trans. Syst. Man, Cybern. A. Syst. Humans*, vol. 38, no. 1, pp. 218-237, January 2008, incorporated herein by reference in its entirety. The chromosome consists of two portions. The first portion stores the activation thresholds of clusters and the second portion stores the centroids of clusters. A cluster is considered active if its activation threshold is greater than a pre-defined value (e.g. 0.5). The fitness of a chromosome is equal to the reciprocal of a cluster validity metric such as Davies Bouldin index (DBI). In each iteration, the data-points are assigned to their nearest active clusters. The DE algorithm creates a new generation of chromosomes by updating the centroids or activation thresholds of the clusters. Changes in the centroids and/or active thresholds values of a chromosome could lead to a new clustering solution. The algorithm ensures that in any chromosome, at least two clusters should remain active. The experimental results showed that it can perform better than some existing algorithms such as GA-based clustering and standard DE algorithm.

Kang et al. have proposed a clustering algorithm based on K-means and Mussels wandering optimization (MWO). See Q. Kang, S. Liu, M. Zhou, and S. Li, "A weight-incorporated similarity-based clustering ensemble method based on swarm intelligence," *Knowl.-Based Syst.*, vol. 104, pp. 156-164, 2016. [Online]. Available: http://www.sciencedirect.com/science/article/pii/S0950705116300739, incorporated herein by reference in its entirety. The MWO basically overcomes the shortcomings of the K-means method. In MWO a solution is called a mussel and contains the centroids of all clusters. The sum of squared errors (SSE) metric is used as the fitness function of a mussels. Each iteration of the MWO algorithm consists of the following three steps: (i) A small pre-defined number of mussels which have best fitness values are determined and their center is calculated; (ii) The position of the mussels are updated following the procedure used in the MWO and with the help of the center calculated in the previous step; and (iii) At the end of each iteration, the top mussels are redetermined and a new center is calculated for the next iteration. The experiments indicate that the algorithm performed better than K-means and a hybrid of K-means with particle swarm optimization (PSO) algorithm.

Preliminary concepts and definitions that are relevant to clustering include those described herein. Consider a data set D that contains N data points and is represented by $D=\{d_0, d_1, \ldots, d_{N-1}\}$. Each data-point $d_i \in D$ consists of m attributes and represented by $d_i=\{x_0, x_1, \ldots, x_{m-1}\}$, where $x_i \in R$. A partitional clustering algorithm tends to find a set of K clusters represented by $\{C_0, C_1, \ldots, C_{K-1}\}$. A cluster $C_j$ is represented by two terms (i) its centroid ($C_j^c=\{c_0, c_1, \ldots, c_{m-1}\}$), and (ii) the data-points which are assigned to it ($C_j^P=\{p_0, \ldots, p_{nj-1}\}$), where $n_j$ represents the number of data-points that are assigned to $C_j$. Any attribute of p, is represented by $p_i[x_j]$, where $j \in \{0, 1, \ldots, m-1\}$ and indicates the index of the attribute. Any two clusters cannot have a same centroid (i.e., $C_j^c \neq C_k^c$, for $j \neq k$). The assignment of data-points to any cluster $C_j$ should meet the following condition: $C_0^P \cup C_1^P \ldots \cup C_{K-1}^P = D$. The center of all data-points in D is represented as C. The centroid of a cluster is equal to the means of all data-points that are assigned to it (assuming that the similarity measure is Euclidean distance). Many clustering algorithms including this work try to find optimal centroids of the clusters rather than finding optimal assignment of data-points. Given a set of centroids, the data-points are assigned to the cluster whose centroid is nearest to it or maximally similar to it using a similarity measure. Euclidean distance is the most commonly used similarity measure and is used in this work. The Euclidean distance between two data-points $d_i$ and $d_j$ is represented by $\|d_i - d_j\|$.

Many cluster validity indices have been developed to measure the quality of clustering. The present disclosure uses two well-established validity indices for objective functions. The two validity indices are as follows: (a) Calinski Harabasz index (CHI), and (b) Dunn index (DI). Both indices compute the ratio of the separation of clusters to their compactness. CHI is defined in (1). The term in numerator computes the average of the squared distance between the centroids of different clusters ($C_k^c$) and the global center of the data-points (C). The term in denominator computes the averaged squared distance of the data-points from the centroids of their clusters. The maximum value is desirable and refers to well-separated and compact clustering.

$$CHI = \frac{\sum_{k=0}^{K-1} n_k \|C_k^c - C\|^2}{K-1} \Big/ \frac{\sum_{k=0}^{K-1} \sum_{d_j \in C_k} \|d_j - C_k^c\|^2}{N-K} \quad (1)$$

The DI is the ratio of the minimum distance between any two data-points that belong to different clusters to the maximum distance between any two-points that lie in a same cluster. The DI is defined in (2), (3), and (4). The function '$\delta(u, v)$' is the smallest distance (or Euclidean distance) between any two data-points that belongs to two different clusters u and v. The function '$\Delta(w)$' is the largest distance between any two data-points that belongs to a same cluster i.e., $C_w$ (where $C_w^P$ is the set of all data-points which are assigned to $C_w$). DI is determined as the ratio of the smallest value of $\delta(u, v)$ over all possible values of u and v (provided $u \neq v$) to the largest value of $\Delta(w)$. A bigger value of DI means better clustering.

$$\delta(u, v) = \min_{x \in C_u^P, y \in C_v^P} (\|x - y\|) \quad (2)$$

$$\Delta(w) = \max_{[x,y] \in C_w^P} (\|x - y\|) \quad (3)$$

$$DI = \frac{\min_{[u,v] \in [0 \ldots K-1], u \neq v} (\delta(u, v))}{\max_{w \in [0 \ldots K-1]} (\Delta(w))} \quad (4)$$

Therefore, one object of the present disclosure is to provide a single-solution-based heuristic that has superior solution quality and takes a fewer number of evaluations to reach optimal value than other conventional heuristics. Another object of the present disclosure is to provide a single-solution-based heuristic that uses memory more efficiently as compared with population-based heuristics.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is an algorithm for finding centroids according to an exemplary aspect of the disclosure;

FIG. 6 illustrates an example storage of a compressed image; and

DETAILED DESCRIPTION

Figure 1:
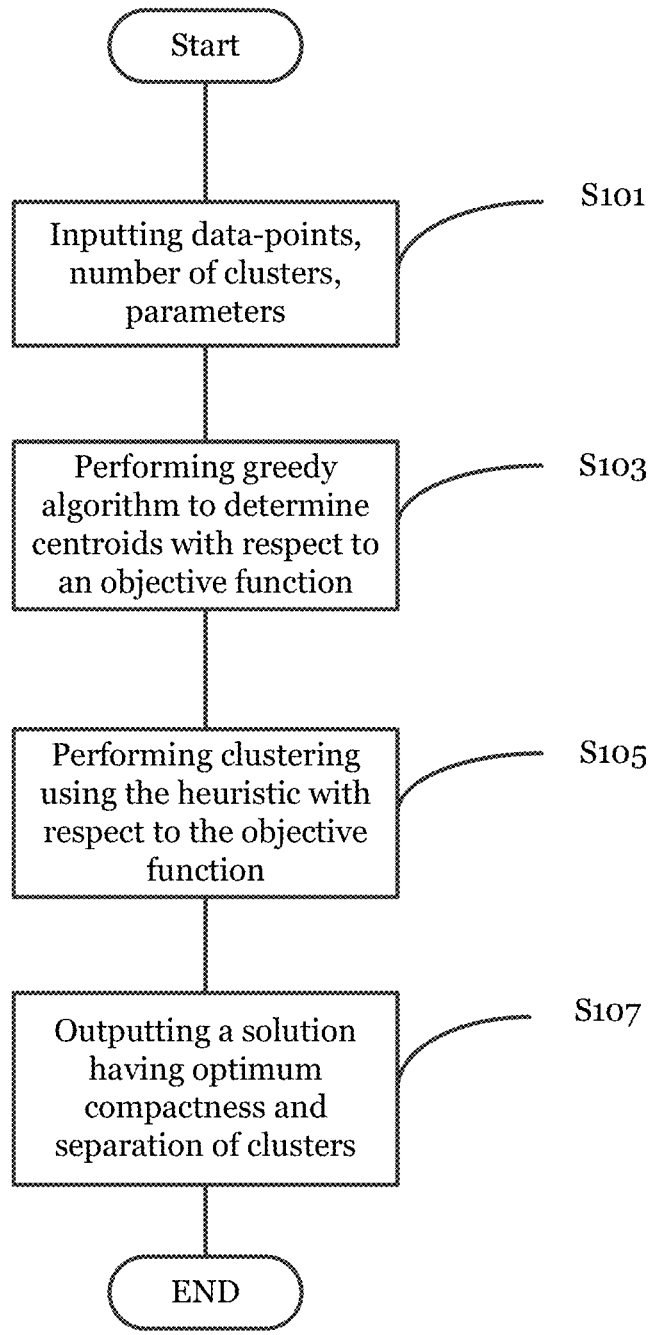
FIG. 1 is a flow diagram illustrating the main components in the data clustering method according to an exemplary aspect of the disclosure.

Evolutionary-type methods mimic the biological process of evolution to solve complex problems. Examples of evolutionary-type methods include Simulated Evolution, Differential Evolution, and Genetic Algorithm. A solution in an evolutionary-type method is composed of many genes. In the context of the clustering problem, the solution consists of the attributes of the centroids of the clusters and hence, a gene is an attribute of a centroid of a cluster. When the number of clusters=K and number of attributes=m, then a solution comprises K×m genes. The evolutionary-type methods can be classified into two types as follows: (i) Population-based evolutionary-type methods, and (ii) Single-solution-based evolutionary-type methods. The single-solution-based evolutionary-type methods keep only one solution during their computation, whereas, the population-based evolutionary-type methods keep a population of solutions during their computation. The population-based evolutionary-type methods use a substantial amount of memory, whereas, the single-solution-based evolutionary-type methods use less memory. The requirement to use a large amount of memory is especially a problem where a computer system's main memory (see 702 in FIG. 7, described later) is limited. The single-solution-based evolutionary-type methods compute fitness of genes in each generation and the least fit genes are likely to be modified through mutation operation. Evolutionary-type methods contain evolutionary operators such as crossover and mutation. An exemplary aspect of the present disclosure is to first perform a greedy algorithm which selects the data-points that can act as centroids of clusters and the criterion is to maximize the separation between clusters. The second part is a single-solution based heuristic method that is an evolutionary-type method. Among the several evolutionary-type algorithms, in an example aspect, the heuristic method may include a combination of features found in a Genetic Algorithm (GA) and a Simulated Evolution (SimE) algorithm. Greedy algorithms themselves may not find a best solution, but do find locally optimal solutions in a reasonable number of steps. In the present disclosure, the single solution based heuristic then determines a globally optimal solution starting from the locally optimal solution of the greedy algorithm.

The heuristic method may undergo one or more iterations in order to find optimal clusters by determining optimal values of all genes with respect to a cluster validity index. In each iteration, the fitness of all genes is determined, and the genes of lesser fitness values may go through a mutation operation. A mutation operation may involve a random change in a value of a gene that resembles mutations that occur in nature. The selection of genes for mutation may resemble the creation of a selection set for the allocation operation in the SimE algorithm. The solution before the application of the mutation is referred as parent and the new solution which is obtained from the mutation operation is referred as mutant. The mutant is then used to update the parent solution. In an exemplary aspect, the parent solution is updated for the next generation as follows: the genes of the mutant that either improve the objective function value or keep the objective function value unchanged of the parent solution always replace the genes in the parent, whereas, the remaining genes of the mutants only replace the genes of the parent with small but variable probability. The iterations continue until the stopping criterion (maximum runtime or maximum iterations) is reached. The heuristic method avoids getting trapped in local optima and determines globally optimal solution.

Example implementations have been conducted to compare the heuristic method with two standard EAs: (i) Simulation Annealing (Gen-SA); and (ii) Differential Evolution (DE) and a Genetic Algorithm (GA) for the clustering problem. See Y. Xiang, S. Gubian, B. Suomela, and J. Hoeng, "Generalized simulated annealing for global optimization: The gensa package," *R J.*, vol. 5, no. 1, pp. 13-29, June 2013. [Online]. Available: http://journal.r-project.org/; K. Mullen, D. Ardia, D. Gil, D. Windover, and J. Cline, "DEoptim: An R package for global optimization by differential evolution," *J. Statist. Softw.*, vol. 40, no. 6, pp. 1-26, April 2011. [Online]. Available: http://www.jstatsoft.org/v40/i06/; and U. Maulik and S. Bandyopadhyay, "Genetic algorithm-based clustering technique," *Pattern Recognit.*, vol. 33, no. 9, pp. 1455-1465, September 2000. [Online]. Available: http://www.sciencedirect.com/science/article/pii/S0031320399001375, each incorporated herein by reference in their entirety. The real-life data-sets of the UCI repository have been used in the experiments. See *UCI Repository of Machine Learning Database*, (1998), accessed on Feb. 24, 2017. [Online]. Available: http://www.ics.uci.edu/~mlearn/MLrepository.html; and *Software Environment for the Advancement of Scholarly Research* (*SEASR*), (2008), accessed on Feb. 24, 2017. [Online]. Available: http://repository.seasr.org/Datasets/UCI/csv/, each incorporated herein by reference in their entirety. The analysis of the experimental results show that the disclosed heuristic is better than the other heuristics in terms of its solution quality and number of evaluations from one generation to the next to reach optimal value.

FIG. 1 is a flow diagram that shows high-level operations of the data clustering method in accordance with an exemplary aspect of the disclosure. The data clustering method consists of two main operations. The input for the data clustering method S101 consists of the following items: (i) Set of data-points (D); (ii) Number of clusters (K), (iii) Five parameters ($\alpha$, $\beta$, $\delta$, $p_m$, B). The first two parameters ($\alpha$ and $\beta$) belong to the first part and the remaining three parameters belong to the second part of the heuristic. The first main operation S103 is a greedy algorithm whose aim is to find points from the data-set that can act as centroids of clusters. A criteria for the selection of centroids is to maximize the inter-cluster separation. The second main operation S105 is a heuristic method that includes features found in GA and SimE algorithms and performs clustering by optimization. In one embodiment, the objective function of optimization is the validity index based on Calinski Harabasz index (CHI) or Dunn index (DI). The validity index ensures a solution, in S107, that optimizes both separation as well as compactness of clusters. The objective function may be represented by $f_n$ and its possible values are $f_n \in \{CHI, DI\}$. The values of both indices are maximized in the optimization.

Algorithm for Finding Optimal Centroids as Data-Points

Figure 3:
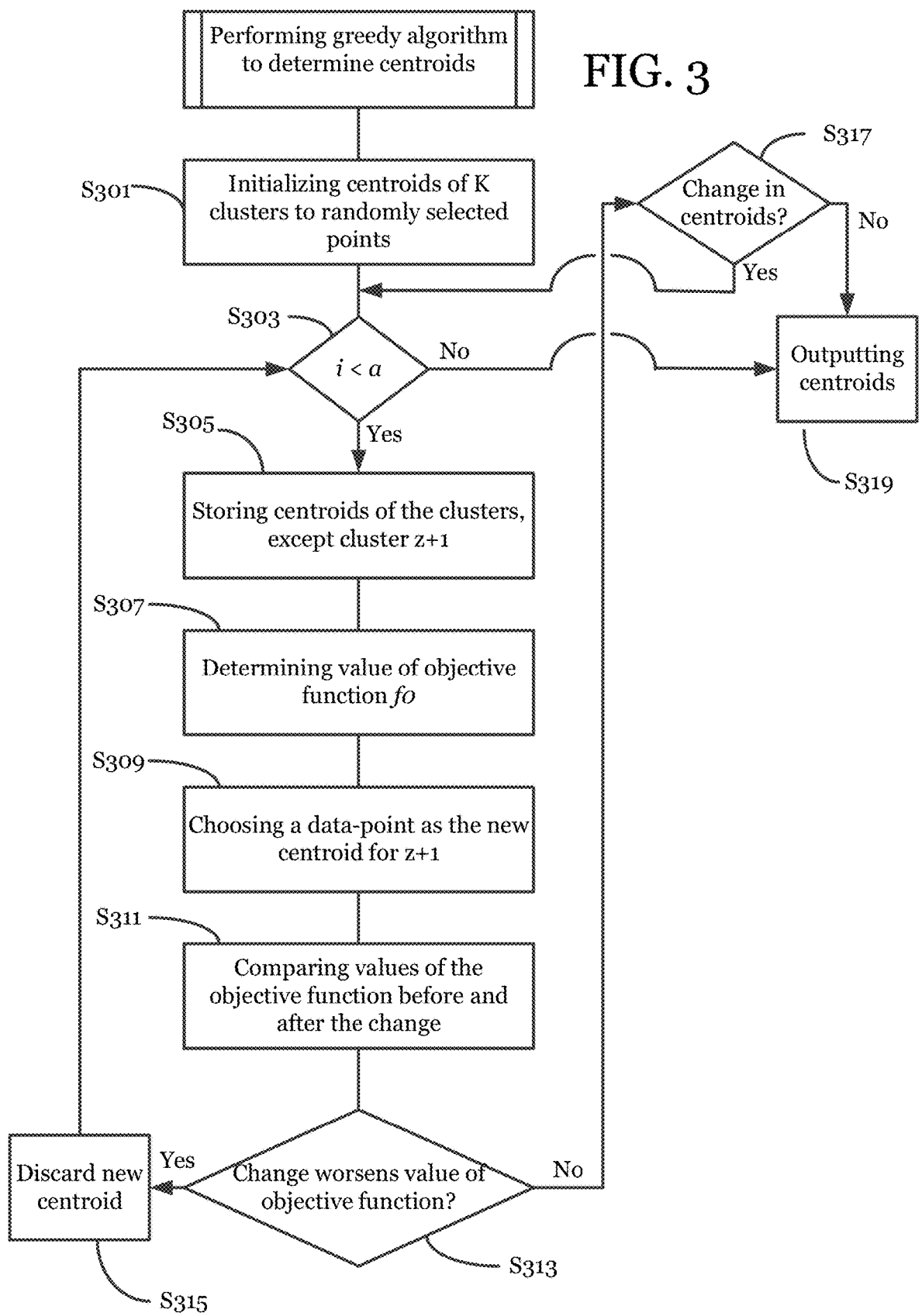
FIG. 3 is a flow diagram, corresponding to the algorithm in FIG. 2, illustrating a greedy algorithm for finding centroids as data-points according to an exemplary aspect of the disclosure.

FIG. 2 shows the first main operation in the data clustering method in the form of an algorithm for finding centroids according to an exemplary aspect of the disclosure. FIG. 3 is a corresponding flow diagram.

The parameters $\alpha$ and $\beta$ are related to the stopping criterion of the algorithm, where $\alpha$ represents the maximum number of iterations and $\beta$ represents the number of iterations without changes. Being a greedy algorithm, the first main operation determines reasonable cluster centers that maximize separation between clusters in a manner that is more time-efficient than conventional evolutionary algorithms. Iterations in the method will be stopped when the value of $\alpha$ is reached or when $\beta$ iterations have occurred without changes. In S301 of FIG. 3 and line 1 of the algorithm, initially up-to K data-points are selected as centroids. In line 4, set $\overline{D}$ holds the data-points which are not currently acting as centroids. In S305 and line 6, the set $D_z$ holds the centroids of all clusters except the $z+1^{th}$ cluster (the cluster $C_z$ is the $z+1^{th}$ cluster because the indices of clusters starts from zero.) The set $P_z$ stores a copy of the centroid of the $z+1^{th}$ cluster. In S307 and line 7, $f_0$ is the value of the objective function before any change has taken place in the current iteration. In S309 and line 8, a data-point is chosen as the new centroid of the $z+1^{th}$ cluster. As the equation shows the new data-point should be the one which has maximum distance from the centroids of the remaining clusters. In S311 and line 9, the values of the objective function before and after the change are compared and, in step S315, the new centroid will be discarded if in S313 it worsens the value of the objective function. S317 and line 13 contains a condition to terminate the loop if the last $\beta$ iterations are unable to produce any change in the centroids. In S303 and line 3, the algorithm can execute for up-to α number of iterations. In S319 and line 17, the first part of the algorithm returns the centers of K clusters.

Heuristic for the Clustering Problem

Figure 4:
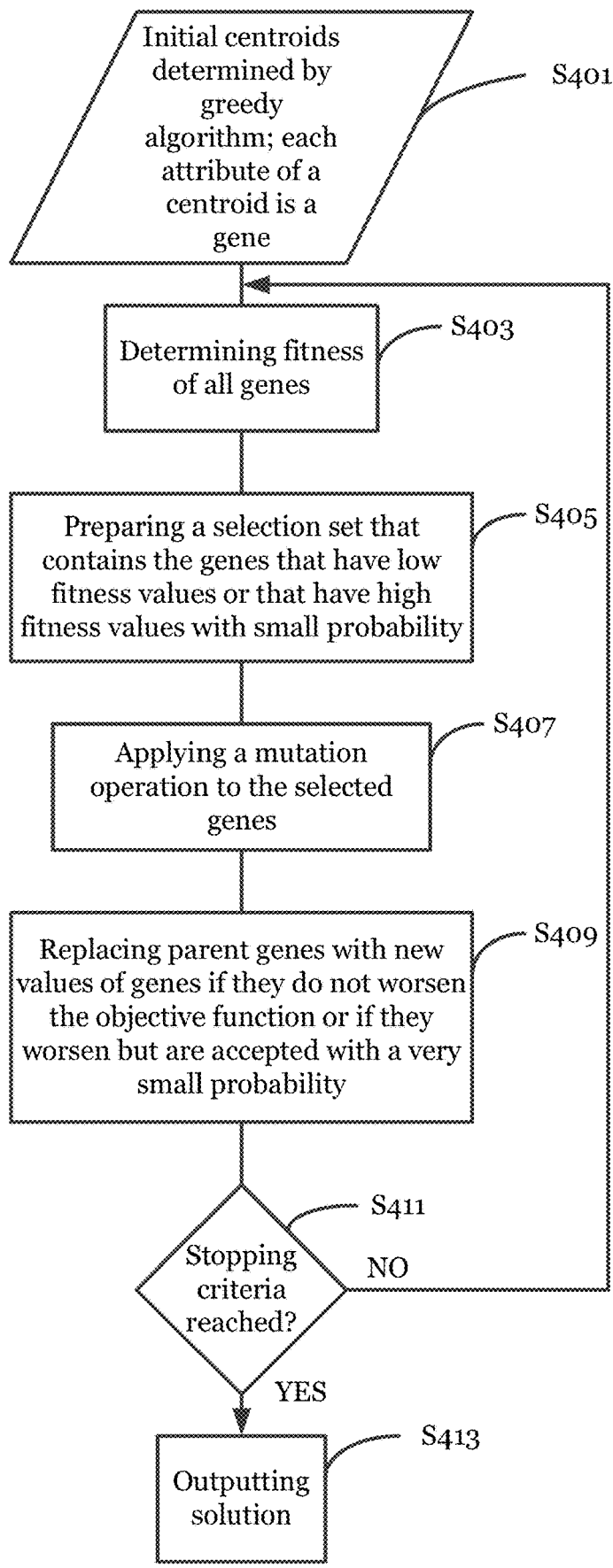
FIG. 4 is a flow diagram illustrating the heuristic method for data clustering according to an exemplary aspect of the disclosure.

FIG. 4 is a flow diagram that shows the heuristic method which is the second main operation in the data-clustering method. The initial centroids determined by the greedy algorithm are provided as inputs, in S401. This allows for the heuristic method to apply evolutionary computation and find a globally optimal solution using fewer evaluations. The heuristic uses only one solution that is composed of genes. In each generation, some genes of the solution are mutated to create an off-spring. The off-spring is called mutant because it is the result of mutation operation. The genes of the mutant are compared with the genes of the parent and based on those results they can either replace the genes of the parent or discarded. Since the heuristic method is an evolutionary computational method, an attribute of a centroid may be considered as a gene, and each gene may be considered to have a level of fitness used to judge whether or not it will be mutated in the creation of the mutant.

In step S403, the fitness of all genes is computed. In step S405, a selection set is prepared that contains the genes that have low fitness values. Some genes of high fitness values could also be selected with a small probability. In step S407, the current solution is referred as parent. A mutation operation is applied to the selected genes of the parent and a mutant is obtained. In step S409, the genes of the mutant replace the value of the same gene in the parent if they do not worsen the objective function value of the parent. However, the values of genes in the mutant that can worsen the objective function value of the parent may also be accepted with a very small probability. The end of step S409, some genes in the parent are updated and mutant is deleted as it is no longer required. The iterations proceed until the stopping criterion is reached S411. The different steps are described below in detail.

1) Step S401: Initialization

In step S401, the centroids determined by the greedy algorithm are set as the initial solution. The centroids are represented as $\{C_0^c, C_1^1, \ldots, C_{K-1}^c\}$ and the attributes of a centroid $C_j^c$ are represented by $\{c_0, c_1, \ldots, c_{m-1}\}$.

2) Step S403: Fitness Computation

In step S403, the fitness of the attributes of all centroids is determined. In one embodiment, the fitness computation may be based on the principle of K-means method, i.e., in each iteration, the centroids of clusters are assigned equal to the mean of the data-points that are assigned to them. In the example embodiment of the heuristic, the fitness of an attribute is inversely proportional to two quantities: (a) the difference of that attribute from the same attribute of the mean of the data-points, and (ii) the number of times that attribute has been mutated in previous iterations.

Equations (5), (6), (7) and (8) show an exemplary aspect of the computation of fitness values of all attributes (i.e., m attributes) of centroid $C_j^c$ (which is the centroid of the $j^{th}$ cluster). In (5), the mean of the data-points that are assigned to the $j^{th}$ cluster is computed and represented by $C_j^m$ ($C_j^m$ has m attributes). The term $\Sigma_{i=0}^{n_j-1} p_i[x_0]$ refers to the sum of the first attribute to all data points that are assigned to the $j^{th}$ cluster. The total number of data-points assigned to the $j^{th}$ cluster is equal to $n_j$. In (6), a difference is computed between the current centroid value of the $j^{th}$ cluster ($C_j^c$) and the mean value from (5). In (6), point-wise differences are computed between the same attributes. In (7), the difference values are divided by the history of the attributes. The history of an attribute is the number of times it has been mutated in previous iterations. The calculations are again point-wise and the difference of the $k^{th}$ attribute is divided by the history of the $k^{th}$ of centroid $C_j^c$. In (8), the values are normalized which are termed as fitness values. The vector $f_j$ consists of m attributes and any $k^{th}$ attribute of $f_j$ holds the fitness value of the $k^{th}$ attribute of $C_j^m$.

$$C_j^m = \frac{1}{n_j} \left\{ \sum_{i=0}^{n_j-1} p_i[x_0], \ldots, \sum_{i=0}^{n_j-1} p_j[x_{m-1}] \right\} \quad (5)$$

$$\Delta_j = C_j^c - C_j^m \quad (6)$$

$$V_j = \frac{\Delta_j}{H[j]} \quad (7)$$

$$f_j = \frac{V_j}{\max(V_j)} \quad (8)$$

3) Step S405: Selection

In step S405, in one embodiment the heuristic uses the selection function of the SimE algorithm and uses the fitness value in place of the algorithm's goodness value. The selection function uses a parameter B which is the Bias factor and its value may lie between [−0.2, +0.2]. The selection function is described in (9). The function applies the selection function on the $j^{th}$ attribute of centroid $C_i^c$ and the result could be 1 or 0. The term 'Random' indicates a random number between [0,1]. The attributes whose result from the selection function is one should go through the mutation operation.

$$s_{ij} = \begin{cases} = 1 & \text{if Random} < 1 - f_i[j] + B \\ = 0 & \text{otherwise} \end{cases} \quad (9)$$

4) Step S407: Mutation

In step S407, in one embodiment the mutation operation may be applied to an attribute (or gene) at a time and it may make a small change in its value. The mutation operation considers the current solution as a parent and creates a mutant solution from it. The mutant is created by changing values of all genes which are present in the selection set. The procedure to change the value of one gene is mentioned below and the same procedure should be repeated for all genes in the selection set. The steps to change the value of the $j^{th}$ attribute of $C_i^c$ (which is a gene) are as described below. The existing value of the $j^{th}$ attribute is represented by $c_j$ and the value after the mutation operation is represented by $c'_j$.

1) The lower ($l_j$) and upper ($u_j$) bounds for the $j^{th}$ attribute may be determined according to (10) and (11). The lower and upper bounds are equal to the minimum and maximum values of the $j^{th}$ attributes of all points in the data-set D.

2) Two intermediate terms: $t_l$ and $t_u$ are computed, where $$t_l = \frac{c_j - l_j}{2} \text{ and } t_u = \frac{u_j - c_j}{2}.$$

3) The new value of the $j^{th}$ attribute (i.e., $c'_j$) may be a randomly selected value from a uniform distribution between $c_j - t_l$ and $c_j + t_u$.

$$l_j = \min_{d_i \in D}(d_i[j]) \quad (10)$$

$$u_j = \max_{d_i \in D}(d_i[j]) \quad (11)$$

All genes in the selection obtain new values using the above steps and new solution is called mutant.

5) Step S409: Solution Update

In step S409, the parent is updated with the help of the mutant to form a new solution for the next generation. In step S409, the value of an attribute (or a gene) in the mutant always replaces the existing value of that attribute (gene) in the parent if it does not worsen the objective function value of the parent. Otherwise, it is accepted only with a very small probability. The procedure to accept the genes of mutant is described below. The existing value of the attribute (i.e., value in the parent) is represented by $c_j$ and the value of that attribute in mutant is represented by $c'_j$.

1) $f_0$ is computed as the objective function value of the parent solution when the $j^{th}$ attribute has value equal to $c_j$.
2) $f_1$ is computed as the objective function value of the parent solution when the $j^{th}$ attribute has value equal to $c'_j$.
3) The value $$\Delta = \frac{\|f_0 f_1\|}{f_0}$$

is computed.

4) If $f_1$ is better than or equal to $f_0$ then the value of the mutant is accepted, i.e., $c_j = c'_j$ in the parent solution.
5) Otherwise, the value of the mutant may be accepted under the following two conditions: (i) $\Delta \leq \delta$, and (ii) with acceptance probability equal to $p_m$.

Both parameters $\delta$ and $p_m$ are real numbers between [0, 1]. The acceptance of worse solutions tends to increase the diversity in the search process. However, in an exemplary aspect the values of $\delta$ and $p_m$ are kept very small in-order to avoid random walk like behavior. It should be understood that random walk behavior is generally an inefficient behavior due to use of random variables and getting trapped in sub-optimal local solutions. The trapping of the search into local optima can also be avoided with the help of acceptance of some mutations that worsen the objective function. Thus, very small values of $\delta$ and $p_m$ are values in the range of greater than zero but less than or equal to 0.1. In step S413, when a stopping criteria (maximum runtime or maximum iterations) is reached (YES in S411), a single solution is reached.

EXAMPLES

The above method can be applied to a number of problems where data is numeric and similarity between any two data-points is measured. In one embodiment, similarity between data points may be measured as the Euclidean distance between them (with any number of attributes and any number of clusters). The above method can be applied in all applications in which the data-set is numeric and the data-points (or samples) that have small Euclidean distance between them are considered similar (for the purpose of clustering) to each other.

Figure 5:
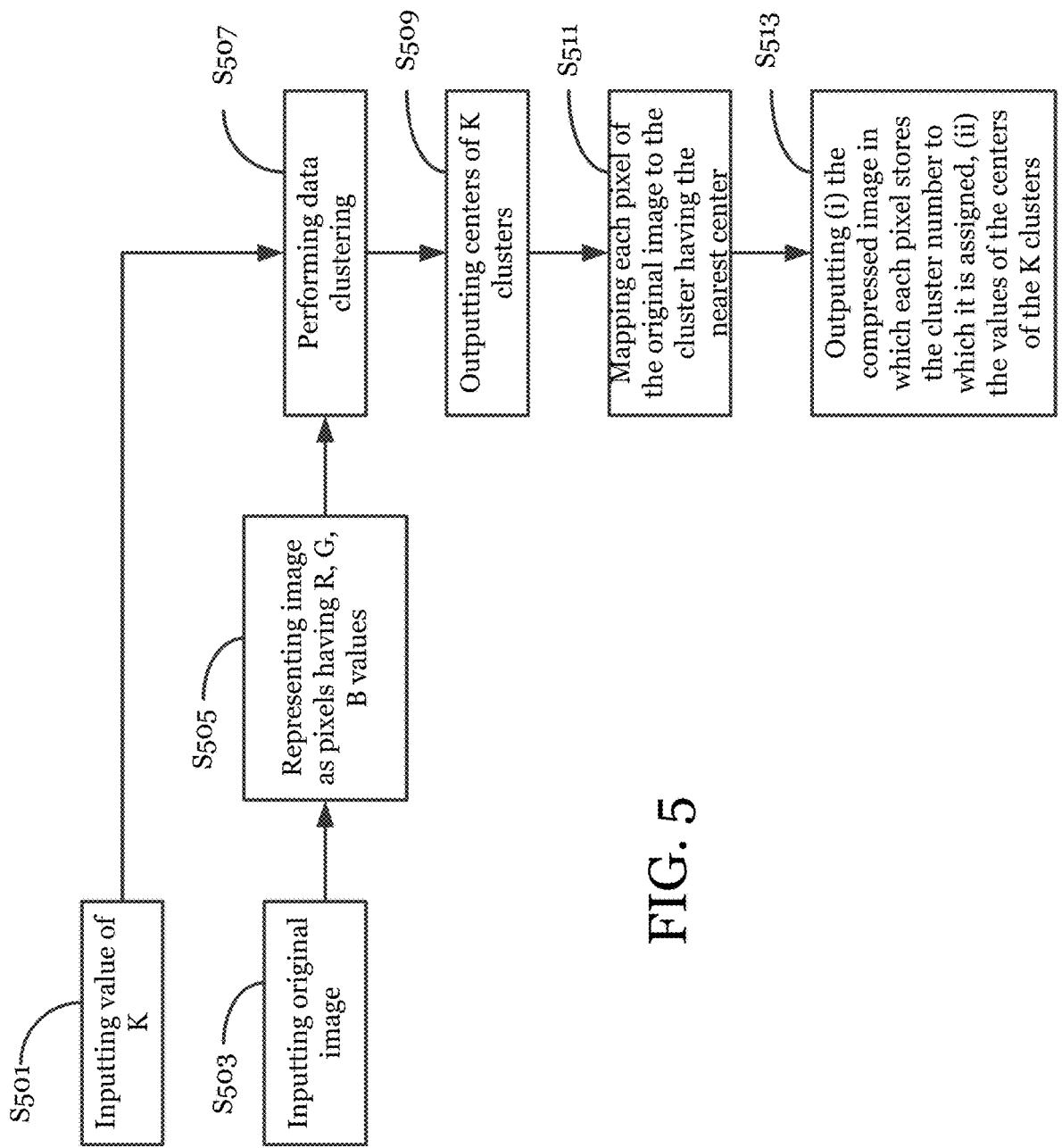
FIG. 5 is a flow diagram illustrating an example application of the data clustering method to perform image compression.

One application of clustering according to the method of the present disclosure is image compression. In one embodiment, an original image having 256 levels can be compressed into 4, 8 or 16 levels using the above method. The number of clusters (K) of the invention correspond to the levels present in the compressed image. The memory requirement of an uncompressed image is 8-bits per pixel (for grey-level image) and 8×3 bits per pixel (for color image). FIG. 5 shows an example application of the heuristic to perform image compression.

An input image consists of pixels and each pixel may have three attributes R, G, and B. The R attribute stores the value of red level, G stores the value of green attribute, and B stores the value of blue color. The value of each attribute of the pixel can lie between 0-255. The number of attributes (which is represented by m) is 3 where each pixel is composed of three colors.

In an un-compressed image, each attribute needs $\log_2 (256)=8$-bits for storage. The memory required to store one pixel is equal to 24-bits. The total memory required to store an image is equal to $w \times h \times \log_2 (256)$-bits, where w and h are the width and height of the image respectively. In compression, the number of levels may be reduced from 256 to a smaller value such as 4, 8, 16, etc. The number of levels corresponds to the number of clusters (K).

Regarding FIG. 5, the color image is inputted S503 and, at S505, first represented into a set of pixels, where each pixel has three attributes. In S501, a value of K is provided, where a smaller value corresponds to high compression, but lesser image quality and a bigger value of K corresponds to less compression but higher image quality. In S507, the above heuristic method is performed, and in S509 returns the centers of the K clusters. The next step is to perform image compression using the centroids. The image compression consists of the two main steps:

1. S511, map each pixel of the image to the cluster whose centroid is nearest from it in terms of Euclidean distance.
2. Separately store the centroids of the K clusters.

The values of centroids of clusters should remain unchanged in the above mentioned assignment. In the compressed image, in S513, each pixel stores the cluster number to which it is assigned. Each pixel needs only $\log_2$ K-bits. When K=8, each pixel needs only 3-bits. The storage of the centers of clusters needs $m \times \log_2$ 256-bits of memory. A comparison of the memory requirement of the compressed and uncompressed image is as follows.

1. Total memory requirement of the compressed image is $(w \times h \times \log_2 K)+(m \times \log_2 256)$-bits.
2. The ratio between the memory requirement of the uncompressed and compressed image is equal to:

$$\frac{w \times h \times m \times \log_2 256}{(w \times h \times \log_2 K) + (m \times \log_2 256 \times K)}$$

3. When w=256, h=256, m=3 (i.e., each pixel is composed of RGB) and K=8, then the value of ratio is 7.99.

FIG. 6 shows an example of the storage of the compressed image. The image has a size of 7×6 pixels and the number of clusters (K) is equal to 8. The (a) of FIG. 6 shows that the pixels store the cluster number to which they have been assigned and the (b) of FIG. 6 stores the centroids of clusters. In (b) of FIG. 6, the first row stores the center of the first cluster and so on.

In the example, a compressed image may be reproduced for display by replacing each pixel with the value of the centroid of the cluster to which it has been assigned. For example, the pixel on the upper left corner is assigned to cluster 0. The center of the first cluster is {128, 10, 13}, therefore, the upper left most pixel would be replaced by the RGB values of {128, 10, 13}.

Figure 7:
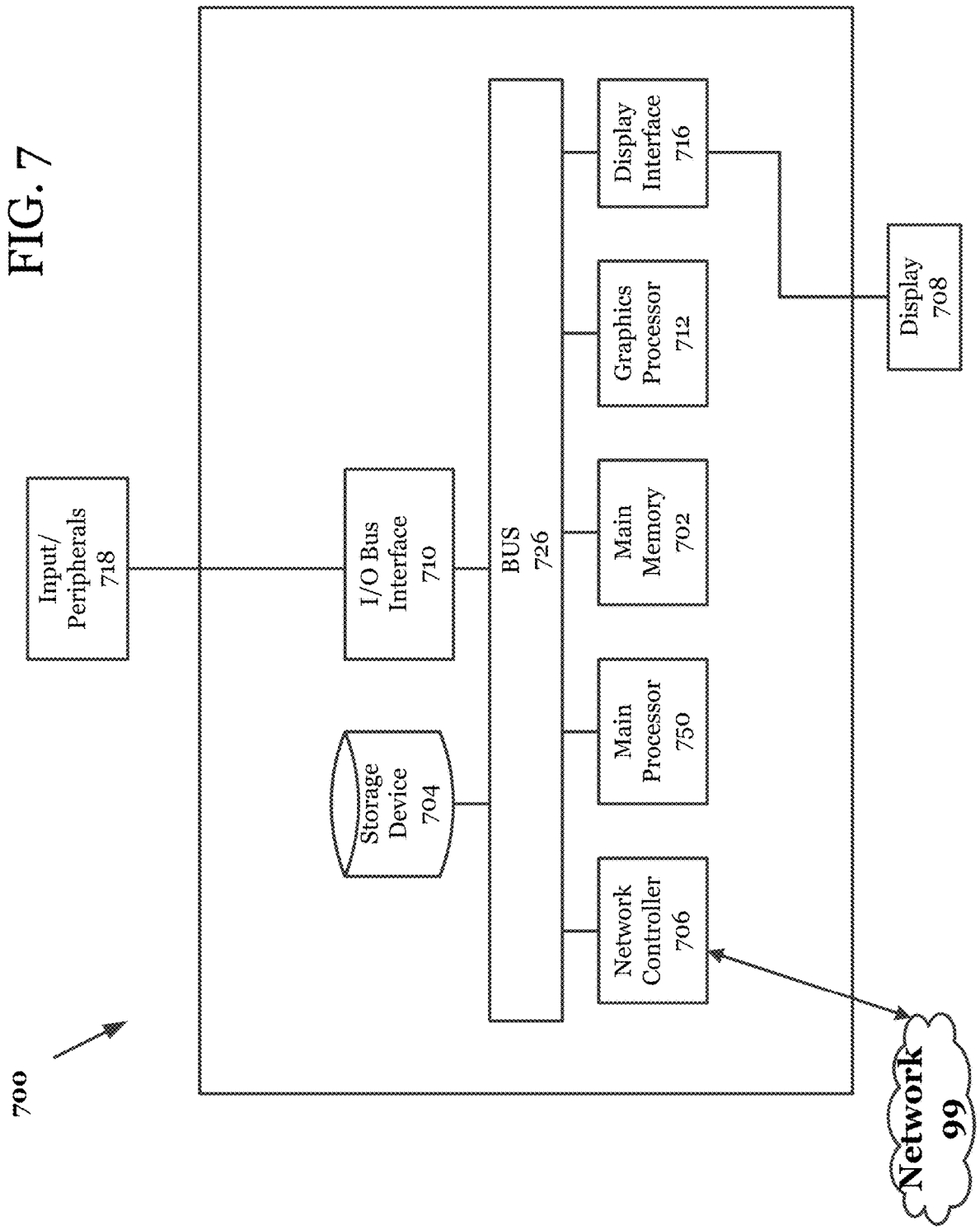
FIG. 7 is a block diagram illustrating an example computer system for performing the data clustering method according to an aspect of the disclosure.

FIG. 7 is a block diagram illustrating an example computer system for implementing the data clustering method according to an exemplary aspect of the disclosure. The above heuristic method may be implemented and executed using R on a Linux-based computer system. The computer system 700 may include one or more main processors 750 and a graphics processing device 712. The graphics processing device 712 may perform many of the mathematical operations of the above heuristic method. The computer system 700 includes main memory 702 that contains the software being executed by the processors 750 and 712, as well as a long term storage device 704 for storing data and the software programs. Several interfaces for interacting with the computer system 700 may be provided, including an I/O Bus Interface 710, Input/Peripherals 718 such as a keyboard, touch pad, mouse, Display Interface 716 and one or more Displays 708, and a Network Controller 706 to enable wired or wireless communication through a network 99. The interfaces, memory and processors may communicate over the system bus 726, such as a PCI bus.

The method of the present disclosure has been incorporated in the computer system as an example implementation. The parameter values used in the example implementation include: $\alpha=300$, $\beta=10$, $\delta=0.01$, $p_m=0.01$, and $B=-0.2$. The parameter values have been determined based on 'iris' through trial and error using some possible values. The dataset of real-life problems from the UC Irvine machine learning repository have also been used in example implementations. Benchmarks have only numeric attributes and have been previously used in the evaluation of the clustering algorithms such as Swarm intelligence and Differential evolution based clustering methods. Table 1 shows characteristics of the benchmarks. The number of data-points range from 150-10992, number of attributes are between 4-60 and number of classes in the data are between 2-10. The example implementations consist of two parts. The first part considers the CHI validity index as the objective function and the second part uses DI validity index as the objective index.

TABLE 1

| Problem | # of data-points | # of clusters (K) | # of attributes |
|---|---|---|---|
| Iris | 150 | 3 | 4 |
| Glass | 214 | 6 | 9 |

TABLE 1-continued

| Problem | # of data-points | # of clusters (K) | # of attributes |
|---|---|---|---|
| Ecoli | 336 | 8 | 7 |
| Banknote authentication | 1372 | 2 | 4 |
| Image segment | 2310 | 7 | 19 |
| Cardiotocography | 2126 | 10 | 21 |
| Student evaluation | 5820 | 3 | 32 |
| Landsat satellite | 6435 | 6 | 36 |
| Pen-based digits | 10992 | 10 | 16 |
| Balance scale | 627 | 4 | 4 |
| Diabetes | 769 | 3 | 8 |
| Heart-statlog | 271 | 3 | 13 |
| Ionosphere | 352 | 3 | 34 |
| Sonar | 209 | 3 | 60 |
| Vehicle | 847 | 5 | 18 |
| Waveform-500 | 5001 | 4 | 40 |

The performance of the heuristic method has been compared with three existing algorithms which are as follows: (a) standard Simulated Annealing (Gen-SA); (b) standard Differential Evolution (DE); and (c) Genetic Algorithm for clustering (GA). The Gen-SA and DE algorithms may be packages in the R programming language. In the examples, the GA algorithm has been implemented in R according to its description. The Gen-SA and DE algorithms have been executed with standard parameter values. The GA algorithm has been executed with the same parameter values as used by its authors, i.e., mutation probability=0.001, cross-over probability=0.80, and population-size=100.

The non-deterministic nature of the algorithms has been considered by conducting up-to 50 trials on each problem. The termination condition of the Gen-SA, DE and GA was set as equal to twice of the maximum number of evaluations of the heuristic in any trial to solve the same problem. For example, if the maximum number of evaluations of the heuristic in the fifty trials of 'iris' is 100, then the other algorithms have been executed for up-to 200 number of evaluations on the 'iris' problem. The results of different algorithms are compared using the average value of their trials and with the help of t-tests. See L. Pace, *Beginning R: An Introduction to Statistical Programming*. New York, N.Y., USA: Apress, 2012, incorporated herein by reference in its entirety. T-tests are commonly used to compare two or more EAs. See A. Alajmi and J. Wright, "Selecting the most efficient genetic algorithm sets in solving unconstrained building optimization problem," *Int. J. Sustain. Built Environ.*, vol. 3, no. 1, pp. 18-26, June 2014. [Online]. Available: http://www.sciencedirect.com/science/article/pii/S2212609014000399, incorporated herein by reference in its entirety.

TABLE 2

| | Proposed | | Gen-SA | | DE | | GA | |
|---|---|---|---|---|---|---|---|---|
| Problem | Mean | SD | Mean | SD | Mean | SD | Mean | SD |
| Iris | 561.6278 | 0 | 561.5296 | 0.4915 | 561.6278 | 0 | 561.6278 | 0 |
| Glass | 124.0103 | 2.2869 | 123.4779 | 1.7761 | 112.1484 | 3.509 | 117.1415 | 2.6268 |
| *Ecoli* | 145.6411 | 3.1929 | 143.2815 | 0 | 108.4265 | 4.9368 | 138.8787 | 2.9514 |
| Banknote authentication | 1423.4569 | 0.3172 | 1423.4145 | 0.5004 | 1423.4756 | 0.1685 | 1409.4623 | 9.7308 |
| Image segment | 1071.86 | 33.5375 | 974.6373 | 21.7361 | 641.4499 | 60.3651 | 1001.1856 | 17.7872 |
| Cardiotocography | 722.9805 | 12.5134 | 682.0008 | 1.8994 | 466.5368 | 20.7833 | 683.592 | 7.2119 |
| Student evaluation | 3204.1164 | 82.9119 | 3211.0215 | 34.0916 | 2955.5275 | 38.4589 | 3198.1964 | 13.901 |
| Landsat satellite | 4646.7676 | 211.9314 | 4711.088 | 178.8783 | 3537.1646 | 81.9229 | 4719.3496 | 26.0458 |

TABLE 2-continued

|  | Proposed | | Gen-SA | | DE | | GA | |
| --- | --- | --- | --- | --- | --- | --- | --- | --- |
| Problem | Mean | SD | Mean | SD | Mean | SD | Mean | SD |
| Pen-based digits | 2734.8316 | 67.1278 | 2757.1396 | 56.1514 | 1902.3729 | 73.1081 | 2590.8703 | 61.5258 |
| Balance scale | 135.6768 | 0.5193 | 135.9312 | 0.5975 | 133.3655 | 0.6095 | 129.9785 | 2.1337 |
| Diabetes | 589.9591 | 0.8942 | 589.9601 | 0.9465 | 587.6764 | 1.1668 | 585.2821 | 0.7508 |
| Heart-statlog | 181.0285 | 2.5323 | 181.5804 | 0.3113 | 180.4245 | 0.5803 | 179.3031 | 0.3113 |
| Ionosphere | 93.5787 | 2.4035 | 93.5308 | 2.4206 | 86.3052 | 1.2365 | 88.9108 | 1.3794 |
| Sonar | 34.6654 | 0 | 34.6564 | 0.0254 | 29.447 | 0.7991 | 25.6406 | 0.7364 |
| Vehicle | 1538.6454 | 4.1843 | 1534.7837 | 8.3351 | 1488.0946 | 12.4833 | 1527.8957 | 3.3607 |
| Waveform-5000 | 635.2917 | 20.8169 | 645.5267 | 8.2394 | 513.7847 | 11.6154 | 570.2637 | 9.661 |

TABLE 3

|  | Proposed | | Gen-SA | | DE | | GA | |
| --- | --- | --- | --- | --- | --- | --- | --- | --- |
| Problem | Mean | SD | Mean | SD | Mean | SD | Mean | SD |
| Iris | 353 | 519 | 975 | 879 | 1749 | 1102 | 655 | 1359 |
| Glass | 4889 | 2999 | 13761 | 2427 | 22480 | 3159 | 31884 | 20123 |
| *Ecoli* | 7535 | 3797 | 25763 | 0 | 23430 | 2781 | 27962 | 25973 |
| Banknote authentication | 734 | 462 | 1511 | 860 | 2295 | 646 | 2801 | 2974 |
| Image segment | 21140 | 9586 | 61405 | 3964 | 56495 | 7672 | 28068 | 37426 |
| Cardiotocography | 43957 | 7887 | 100415 | 301 | 94763 | 6969 | 139412 | 73565 |
| Student evaluation | 16226 | 4817 | 39176 | 4512 | 41929 | 2719 | 71098 | 31612 |
| Landsat satellite | 20574 | 4964 | 47522 | 1519 | 44864 | 5325 | 38417 | 40614 |
| Pen-based digits | 28497 | 6112 | 64319 | 1789 | 63498 | 4098 | 99891 | 47440 |
| Balance scale | 1765 | 876 | 5043 | 1102 | 5720 | 991 | 7968 | 6045 |
| Diabetes | 3427 | 1533 | 7917 | 2474 | 10204 | 1263 | 18696 | 9442 |
| Heart-statlog | 3472 | 3024 | 7191 | 4818 | 14502 | 3257 | 23931 | 15531 |
| Ionosphere | 10243 | 7341 | 27275 | 9204 | 44339 | 4472 | 10504 | 25780 |
| Sonar | 6790 | 4970 | 37461 | 5719 | 44079 | 4346 | 3040 | 7955 |
| Vehicle | 13783 | 6082 | 31861 | 8704 | 39150 | 3245 | 55964 | 30373 |
| Waveform-5000 | 17636 | 2471 | 41410 | 1670 | 38967 | 5006 | 785 | 642 |

Table 2 shows the solution quality results when objective function is to maximize CHI. The results of each algorithm are presented under its label and consists of two columns. The first column ('Mean') contains the mean value of the fifty trials and the second column ('SD') contains the standard deviation of the fifty trials. The results indicate that the mean CHI values of the heuristic are better than the other algorithms in most of the problems. Table 3 shows the number of evaluations when objective function is to maximize CHI. The results of each algorithm consist of two columns. The first column contains the mean and the second column contains the standard deviation. The results show that the heuristic requires very small number of evaluations to reach its best results as compared to the other algorithms.

Tables 4 and 5 show the results of the two-sided t-tests to determine if the solution quality (CHI) and number of evaluations of the heuristic method are better than the other algorithms. Table 4 shows a comparison the CHI results of the heuristic with others using t-tests. The t-tests have been performed with significance level equal to 0.05. A t-test compares results of two algorithms at a time and returns a p-value. When the p-value is equal to or greater than the significance level (0.05) then the results of both algorithms are considered equal to each other. However, when the p-value is smaller than the significance level then the results of the two algorithms are not equal and the algorithm that has a better mean is considered better. Tables 4 and 5 also contains a column 'remarks', that indicates if the result of the heuristic method is equal, better or worse than the other algorithm.

A comparison of the heuristic method with Gen-SA using the results in Table 4 indicates the following: (i) the heuristic method produced better results in five problems; (ii) the results are equal in eight problems; and (iii) the results of Gen-SA are better than that of the heuristic method in two problems. Table 4 also shows that the results of the heuristic method are better than that of DE in thirteen problems and equal to DE in two problems. The last two columns in Table 4 show that the results of the heuristic method are better than that of GA in thirteen problems, equal to GA in one problem and worse then GA in only one problem. Table 4 does not include the problem 'iris' because the results of iris are same in all trials (standard deviation is equal to zero for three algorithms) as shown in Table 2 and does not require further evaluation using t-tests. In 'iris' problem, all algorithms returned same results.

TABLE 4

| Problem | vs. Gen-SA | | vs. DE | | vs. GA | |
| --- | --- | --- | --- | --- | --- | --- |
| | p-value | remarks | p-value | remarks | p-value | remarks |
| Glass | 0.1958 | Equal | 8.763e−34 | Better | 7885d.25 | Better |
| Ecoli | 3.553e−06 | Better | 2.512e−60 | Better | 9.073−19 | Better |
| Banknote authentication | 0.6143 | Equal | 0.713 | Equal | 1.142e−13 | Better |
| Image segment | 2.928e−29 | Better | 3.443e−56 | Better | 3.913e−21 | Better |
| Cardiotocography | 1.408e−28 | Better | 4.533e−76 | Better | 1.783e−31 | Better |
| Student evaluation | 0.5879 | Equal | 1.83e−29 | Better | 0.6206 | Equal |
| Landsat satellite | 0.1368 | Equal | 4.327e−36 | Better | 0.03311 | Worse |
| Pen-based digits | 0.07465 | Equal | 3.445e−78 | Better | 3.766e−19 | Better |
| Balance scale | 0.0253 | Worse | 1.296e−36 | Better | 4.657e−25 | Better |
| Diabetes | 0.9957 | Equal | 2.092e−18 | Better | 3.6953e−48 | Better |
| Heart-statlog | 0.1324 | Equal | 0.106 | Equal | 1.545e−05 | Better |
| Ionosphere | 0.9211 | Equal | 4.582e−30 | Better | 3.048e−19 | Better |
| Sonar | 0.01503 | Better | 4.698e−42 | Better | 2.776e−55 | Better |
| Vehicle | 0.004563 | Better | 2.359e−35 | Better | 5.194e−25 | Better |
| Waveform-5000 | 0.0004974 | Worse | 1.271e−62 | Better | 3.886e−38 | Better |

Note:

significance level = 0.05

Table 5 shows the result of t-tests that compare the number of evaluations of the heuristic method with others using t-tests when objective function is CHI. the results of the t-tests that compare of the number of evaluations of the algorithms. The results convey the following information: (i) The number of evaluations of the heuristic is better than that of Gen-SA and DE in all problems and better than that of GA in eleven problems.

TABLE 5

| Problem | vs. Gen-SA | | vs. DE | | vs. GA | |
| --- | --- | --- | --- | --- | --- | --- |
| | p-value | remarks | p-value | remarks | p-value | remarks |
| Iris | 4.701e−05 | Better | 1.253e−11 | Better | 0.148 | Equal |
| Glass | 4.671e−29 | Better | 3.154e−49 | Better | 1.046e−12 | Better |
| Ecoli | 1.052e−35 | Better | 1.127e−40 | Better | 1.213e−06 | Better |
| Banknote authentication | 2.991e−07 | Better | 5.494e−24 | Better | 1.168e−05 | Better |
| Image segment | 1.453e.37 | Better | 3.902e−36 | Better | 0.2101 | Equal |
| Cardiotocography | 4.775e−44 | Better | 1.116e−55 | Better | 3.141e−12 | Better |
| Student evaluation | 1.333e−43 | Better | 3.443e−47 | Better | 1.085e−16 | Better |
| Landsat satellite | 2.477e−35 | Better | 1.562e−35 | Better | 0.007168 | Better |
| Pen-based digits | 1.912e−43 | Better | 3.91e−51 | Better | 2.175e−14 | Better |
| Balance scale | 2.356e−29 | Better | 5.177e−38 | Better | 2.801e−09 | Better |
| Diabetes | 1.264e−17 | Better | 3.52e−42 | Better | 1.512e−15 | Better |
| Heart-statlog | 1.384e−05 | Better | 6.288e−32 | Better | 1.846e−12 | Better |
| Ionosphere | 6.42e−17 | Better | 1.861e−43 | Better | 0.9453 | Equal |
| Sonar | 7.7e−49 | Better | 1.006e−61 | Better | 0.005903 | Worse |
| Vehicle | 2.865e−20 | Better | 3.168e−39 | Better | 3.15e−13 | Better |
| Waveform-5000 | 1.104e−87 | Better | 3.367e−49 | Better | 4.363e−58 | Worse |

Note:

significance level = 0.05

Table 6 shows a summary of the results of t-tests to compare both solution quality when objective function is CHI and number of evaluations (Eval. count). The results are expressed in terms of three symbols '+, =, −', which indicate that the heuristic method is better (+), equal (=) or worse (−) than the other algorithm. The results indicate that none of the other algorithms is better than the heuristic method in both solution quality and number of evaluations. When compared to Gen-SA, the heuristic method has same quality but better number of evaluations in majority of the problems. When compared to DE and GA, the heuristic method has better quality as well as number of evaluations in most of the problems.

TABLE 6

| Problem | vs. Gen-SA | | vs. DE | | vs. GA | |
| --- | --- | --- | --- | --- | --- | --- |
|  | CHI | Eval. count | CHI | Eval. count | CHI | Eval. count |
| Iris | = | + | = | + | = | = |
| Glass | + | + | + | + | + | + |
| Ecoli | + | + | + | + | + | + |
| Banknote authentication | = | + | = | + | + | + |
| Image segment | + | + | + | + | + | = |
| Cardiotocography | + | + | + | + | + | + |
| Student evaluation | = | + | + | + | = | + |
| Landsat satellite | = | + | + | + | − | + |
| Pen-based digits | = | + | + | + | + | + |
| Balance scale | − | + | + | + | + | + |
| Diabetes | = | + | + | + | + | + |
| Heart-statlog | = | + | = | + | + | + |
| Ionosphere | = | + | + | + | + | = |
| Sonar | + | + | + | + | + | − |
| Vehicle | + | + | + | + | + | + |
| Waveform-5000 | − | + | + | + | + | − |

In the second part of examples, the objective function can also be set to maximize cluster validity index DI. The results are presented in the same format as presented for CHI. Tables 7 and 8 present the solution quality (DI) and number of evaluations of the method and other algorithms. Table 7 shows solution quality results when objective function is to maximize DI. Table 8 shows a number of evaluations when objective function is to maximize DI. Tables 9 and 10 show the results of analysis using t-tests. Table 9 shows a comparison of the DI results of the heuristic with others using t-tests. The results in Table 9 convey the following information about the solution quality of the heuristic method: (i) It has better solution quality (DI) than Gen-SA in seven problems; (ii) It has a solution quality (DI) equal to Gen-SA in four problems; (iii) It is better than DE in solution quality (DI) in ten problems; (iv) It is equal to DE in three problems; (v) It is better than GA in ten problems; and (vi) It is equal to GA in two problems.

Table 10 shows a comparison the number of evaluations of the heuristic method with others using t-tests when objective function is DI. The results in Table 10 indicate that the number of evaluations of the heuristic method are better or equal to that of the other algorithms (Gen-SA, DE and GA) in most of the problems.

Table 11 shows a summary of the comparisons using t-tests when objective function is DI. The summary reveals the following information about the comparison of the heuristic method with Gen-SA: (i) In five problems, the heuristic method is better in terms of solution quality (DI) and has number of evaluations equal or smaller than that of Gen-SA; (ii) In four problems, the heuristic method is equal to Gen-SA in solution quality (DI) but has better evaluation count; (iii) In two problems, the heuristic method has better solution quality but more number of evaluations; and (iii) In two problems, the Gen-SA has better solution quality and equal or smaller number of evaluations; and (iii) in three problems, the Gen-SA has better solution quality (DI) but has a worse number of evaluations (since Gen-SA was allowed to execute for two-times more number of evaluations than the heuristic). Table 11 also shows that the heuristic method is better than DE and GA in terms of both solution quality (DI) and number of evaluations in most of the problems.

TABLE 7

| Problem | Proposed | | Gen-SA | | DE | | GA | |
|---|---|---|---|---|---|---|---|---|
| | Mean | SD | Mean | SD | Mean | SD | Mean | SD |
| Iris | 0.1665 | 0.006 | 0.1691 | 0 | 0.1691 | 0 | 0.1545 | 0.0072 |
| Glass | 0.245 | 0.0028 | 0.2447 | 0 | 0.2426 | 0.0058 | 0.1877 | 0.0122 |
| Ecoli | 0.1494 | 0.0151 | 0.135 | 0 | 0.1018 | 0.0101 | 0.1102 | 0.0137 |
| Banknote authentication | 0.0969 | 0.0132 | 0.1041 | 0.0017 | 0.1043 | 0.0019 | 0.0718 | 0.0275 |
| Image segment | 0.4455 | 0.0642 | 0.4609 | 0 | 0.4609 | 0 | 0.0133 | 0.0111 |
| Cardiotocography | 0.0458 | 0.0068 | 0.0263 | 0 | 0.0254 | 0.0043 | 0.0295 | 0.003 |
| Student evaluation | 0.0569 | 0.015 | 0.0511 | 0.0037 | 0.0538 | 0.0084 | 0.1321 | 0.063 |
| Landsat satellite | 0.065 | 0.0034 | 0.0521 | 0.0029 | 0.0575 | 0.0038 | 0.0668 | 0.0021 |
| Pen-based digits | 0.0408 | 0.0028 | 0.0331 | 0.0014 | 0.036 | 0.0011 | 0.0416 | 0.0022 |
| Balance scale | 0.1579 | 9e−04 | 0.1551 | 0.0033 | 0.1542 | 0.0026 | 0.1497 | 0.0044 |
| Diabetes | 0.09 | 0.0024 | 0.0895 | 0.0023 | 0.0874 | 0.0022 | 0.0846 | 0.009 |
| Heart-statlog | 0.1165 | 0.0067 | 0.1235 | 0.0136 | 0.1173 | 0.007 | 0.1191 | 0.0091 |
| Ionosphere | 0.1924 | 0.0364 | 0.3705 | 0.0786 | 0.2325 | 0.0316 | 0.3933 | 6e−04 |
| Sonar | 0.3698 | 0.0255 | 0.426 | 0.0619 | 0.3295 | 0.0139 | 0.5015 | 0 |
| Vehicle | 0.1054 | 0.0078 | 0.1041 | 0.0076 | 0.0912 | 0.0037 | 0.0898 | 0.0048 |
| Waveform-5000 | 0.3384 | 0.0302 | 0.2584 | 0.0064 | 0.2669 | 0.0094 | 0.3105 | 0.0122 |

TABLE 8

| Problem | Proposed | | Gen-SA | | DE | | GA | |
|---|---|---|---|---|---|---|---|---|
| | Mean | SD | Mean | SD | Mean | SD | Mean | SD |
| Iris | 826 | 741 | 969 | 735 | 742 | 675 | 2248 | 3703 |
| Glass | 2842 | 3123 | 6246 | 1454 | 14054 | 6358 | 33366 | 20686 |
| Ecoli | 6497 | 3890 | 24037 | 0 | 17887 | 6072 | 24686 | 24976 |
| Banknote authentication | 397 | 404 | 524 | 522 | 478 | 563 | 2919 | 2313 |
| Image segment | 1427 | 942 | 2785 | 777 | 803 | 1635 | 11468 | 5243 |
| Cardiotocography | 2970 | 560 | 1734 | 0 | 3165 | 2737 | 9482 | 5068 |
| Student evaluation | 113 | 92 | 474 | 286 | 543 | 305 | 1067 | 730 |
| Landsat satellite | 352 | 62 | 310 | 250 | 1086 | 650 | 1078 | 666 |
| Pen-based digits | 258 | 26 | 133 | 86 | 789 | 441 | 859 | 358 |
| Balance scale | 1040 | 715 | 4683 | 1256 | 3761 | 1387 | 5883 | 4999 |
| Diabetes | 2977 | 1785 | 8571 | 1863 | 7100 | 2724 | 10375 | 9903 |
| Heart-statlog | 4720 | 2666 | 14126 | 3561 | 12925 | 4424 | 15649 | 16292 |
| Ionosphere | 11535 | 7410 | 35144 | 8361 | 34731 | 12267 | 51808 | 34172 |
| Sonar | 16680 | 13511 | 52235 | 15023 | 64795 | 18216 | 20737 | 20683 |
| Vehicle | 9401 | 6315 | 35856 | 7228 | 32749 | 7290 | 33799 | 30102 |
| Waveform-5000 | 471 | 66 | 424 | 351 | 788 | 467 | 1668 | 767 |

TABLE 9

| Problem | vs. Gen-SA | | vs. DE | | vs. GA | |
|---|---|---|---|---|---|---|
| | p-value | remarks | p-value | remarks | p-value | remarks |
| Iris | 0.002888 | Worse | 0.002888 | Worse | 2.531e−14 | Better |
| Glass | 0.3216 | Equal | 0.008797 | Better | 4.879e−37 | Better |
| Ecoli | 1.888e−08 | Better | 1.367e−31 | Better | 3.832e−24 | Better |
| Banknote authentication | 0.0003501 | Worse | 0.0002555 | Worse | 1.58e−07 | Better |
| Image segment | 0.09474 | Equal | 0.09474 | Equal | 3.438e−44 | Better |
| Cardiotocography | 2.718e−25 | Better | 5.655e−30 | Better | 1.011e−23 | Better |
| Student evaluation | 0.03753 | Better | 0.3078 | Equal | 9.417e−08 | Worse |
| Landsat satellite | 6.478e−33 | Better | 7.162e−16 | Better | 0.003038 | Worse |
| Pen-based digits | 2.402e−14 | Better | 4.46e−09 | Better | 0.2794 | Equal |
| Balance scale | 3.227e−07 | Better | 1.473e−13 | Better | 3.938e−18 | Better |
| Diabetes | 0.298 | Equal | 1.681e−07 | Better | 0.0001302 | Better |
| Heart-statlog | 0.001656 | Worse | 0.576 | Equal | 0.1028 | Equal |
| Ionosphere | 1.056e−22 | Worse | 5.971e−08 | Worse | 1.329e−38 | Worse |
| Sonar | 1.216e−07 | Worse | 3.961e−15 | Worse | 3.445e−37 | Worse |
| Vehicle | 0.4126 | Equal | 6.766e−18 | Better | 1.06e−19 | Better |
| Waveform-5000 | 9.921e−25 | Better | 4.802e−23 | Better | 7.514e−08 | Better |

Note:
significance level = 0.05

TABLE 10

| Problem | vs. Gen-SA | | vs. DE | | vs. GA | |
|---|---|---|---|---|---|---|
| | p-value | remarks | p-value | remarks | p-value | remarks |
| Iris | 0.3351 | Equal | 0.5562 | Equal | 0.01024 | Better |
| Glass | 1.374e−09 | Better | 2.308e−17 | Better | 4.169e−14 | Better |
| *Ecoli* | 1.978e−34 | Better | 3.041e−18 | Better | 5.178e−06 | Better |
| Banknote authentication | 0.1792 | Equal | 0.4123 | Equal | 5.624e−10 | Better |
| Image segment | 6.001e−12 | Better | 0.02182 | Worse | 1.995e−18 | Better |
| Cardiotocography | 1.225e−20 | Worse | 0.6238 | Equal | 4.282e−12 | Better |
| Student evaluation | 3.292e−08 | Better | 2.574e−09 | Better | 1.477e−08 | Better |
| Landsat satellite | 0.2792 | Equal | 1.636e−09 | Better | 3.944e−09 | Better |
| Pen-based digits | 1.586e−07 | Worse | 3.18e−06 | Better | 1.284e−08 | Better |
| Balance scale | 3.457e−29 | Better | 1.478e−19 | Better | 1.203e−08 | Better |
| Diabetes | 9.31e−28 | Better | 7.078e−14 | Better | 3.406e−06 | Better |
| Heart-statlog | 3.234e−26 | Better | 3.757e−18 | Better | 2.103e−05 | Better |
| Ionosphere | 7.347e−27 | Better | 1.443e−18 | Better | 6.086e−11 | Better |
| Sonar | 8.358e−22 | Better | 2.904e−26 | Better | 0.2488 | Equal |
| Vehicle | 3.482e−35 | Better | 6.236e−31 | Better | 7.411e−07 | Better |
| Waveform-5000 | 0.3563 | Equal | 1.743e−05 | Better | 6.751e−15 | Better |

Note:
significance level = 0.05

TABLE 11

| Problem | vs. Gen-SA | | vs. DE | | vs. GA | |
|---|---|---|---|---|---|---|
| | CHI | Eval. count | CHI | Eval. count | CHI | Eval. count |
| Iris | − | = | − | = | + | + |
| Glass | = | + | + | + | + | + |
| *Ecoli* | + | + | + | + | + | + |
| Banknote authentication | − | = | − | = | + | + |
| Image segment | = | + | = | − | + | + |
| Cardiotocography | + | − | + | = | + | + |
| Student evaluation | + | + | = | + | − | + |
| Landsat satellite | + | = | + | + | − | + |
| Pen-based digits | + | − | + | + | = | + |
| Balance scale | + | + | + | + | + | + |
| Diabetes | = | + | = | + | + | + |
| Heart-statlog | − | + | = | + | = | + |
| Ionosphere | − | + | − | + | − | + |
| Sonar | − | + | + | + | − | = |
| Vehicle | = | + | + | + | + | + |
| Waveform-5000 | + | = | + | + | + | + |

The invention claimed is:

1. A computer system comprising:
a display; and
one or more processors configured to execute a computer program stored in a memory,
the computer program when executed performs inputting, to the computer system, a color image having a plurality of pixels and a number of clusters;
maximizing distances between centroids of the clusters using greedy search, including selecting new centroids that have maximum distance from the centroids of others of the clusters and that improve a value of a cluster validity index;
using an evolutionary-type search, adjust the new centroids of the clusters with respect to the cluster validity index that considers compactness of the clusters as well as separation between the clusters;
using the adjusted centroids, assign each pixel to the cluster whose centroid has the smallest Euclidean distance from the pixel;
storing, in the memory, a compressed image in which each pixel is stored with the assigned cluster, and the centroids of all clusters; and
displaying, by the display, the compressed image in which each pixel is displayed with the centroid of the assigned cluster,
wherein attributes of the centroids represent genes and the evolutionary-type search adjusts the centroids by selecting a subset of the genes;
performing a mutation operation on the selected genes to obtain a mutant solution;
determining the validity index based on a ratio of separation between clusters to the compactness of the clusters for the clusters before the mutation operation and after the mutation operation; and
replacing a value of an attribute in a solution with the value of same attribute in the mutant solution if the determined validity index after the mutation operation is greater than or equal to the validity index before the mutation operation.

2. The computer system of claim 1, wherein the greedy search determines centroids of clusters that maximize inter-cluster separation.

3. The computer system of claim 2, wherein the greedy search selects a candidate centroid which has a maximum distance from determined centroids of the clusters and adds the candidate centroid to the determined centroid if the value of the validity index is improved.

4. The computer system of claim 3, wherein the greedy search discards the candidate centroid if the candidate worsens the value of the validity index.

5. The computer system of claim 1, wherein the value of the attribute in the solution is replaced with the value of the same attribute in the mutant solution if the determined validity index after the mutation operation is less that the validity index before the mutation operation, when the difference in validity index is below a predetermined threshold and a probability of acceptance is greater than a predetermined probability.

6. The computer system of claim 5, wherein the predetermined threshold and the predetermined probability are greater than 0 and less than or equal to 0.1.

7. The computer system of claim 1, wherein the evolutionary-type search includes a selection function that is based on a fitness value, wherein the fitness value is determined based on the number of times the attribute has previously been mutated, and wherein the mutation operation is performed on attributes selected by the selection function.

8. The computer system of claim 7, wherein the evolutionary-type search uses a measure of similarity between pixels that is performed using Euclidean distance.

9. The computer system of claim 1, wherein each pixel comprises a plurality of attributes.

10. A method, in a computer system comprising a display, one or more processors and a memory storing a program, the program when executed performs the method comprising:
inputting, to the computer system, a color image having a plurality of pixels and a number of clusters;
distances between centroids of the clusters using greedy search, including selecting new centroids that have maximum distance from the centroids of others of the clusters and that improve a value of a cluster validity index;
performing an evolutionary-type search to adjust the new centroids of the clusters with respect to the validity index that considers compactness of the clusters as well as separation between clusters;
using the adjusted centroids, assign each pixel to the cluster whose centroid has the minimum Euclidean distance between the pixel and the centroid of the cluster;
storing, in a storage device, a compressed image in which each pixel is stored with the assigned cluster, and the centroids of all clusters; and
displaying, by the display, a compressed image in which each pixel is displayed with the centroid of the assigned cluster,
wherein the centroids include attributes representing genes and the evolutionary-type search adjusts the centroids by
selecting a subset of the genes;
performing a mutation operation on a selected subset of genes to obtain a mutant solution;
determining the validity index based on a ratio of separation between clusters to the compactness of the clusters for the clusters before the mutation operation and after the mutation operation and
replacing a value of an attribute of a solution with the value of the mutant solution in response to a determination that the determined validity index after the mutation operation is greater than or equal to the validity index before the mutation operation.

11. The method of claim 10, wherein the greedy search determines centroids that maximize inter-cluster separation.

12. The method of claim 11, wherein the greedy search selects a candidate centroid which has a maximum distance from determined centroids of the clusters and adds the candidate center to the determined centroids in response to a determination that the value of the validity index is improved.

13. The method of claim 12, wherein the greedy search discards the candidate center in response to a determination that the candidate worsens the value of the validity index.

14. The method of claim 10, wherein the value of the attribute in the solution is replaced with the value of the mutant solution if the determined validity index after the mutation operation is less than the validity index before the mutation operation, when the difference in validity index is below a predetermined threshold and a probability of acceptance is greater than a predetermined probability.

15. The method of claim 14, wherein the predetermined threshold and the predetermined probability are greater than 0 and less than or equal to 0.1.

16. The method of claim 10, wherein the evolutionary-type search includes a selection function that incorporates a fitness value, wherein the fitness value is determined based on the number of times that the attribute has previously been mutated, and wherein the mutation operation is performed on genes selected by the selection function.

17. The method of claim 10, wherein the evolutionary-type search uses a measure of similarity between pixels that is performed using Euclidean distance.

18. The method of claim 10, wherein each pixel comprises a plurality of attributes.

* * * * *